No. 804,446. PATENTED NOV. 14, 1905.
C. F. WIESENMEYER.
HARNESS SADDLE.
APPLICATION FILED MAR. 7, 1905.
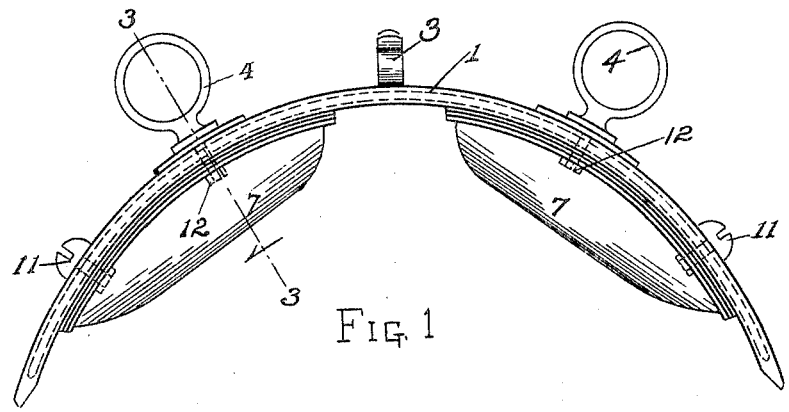
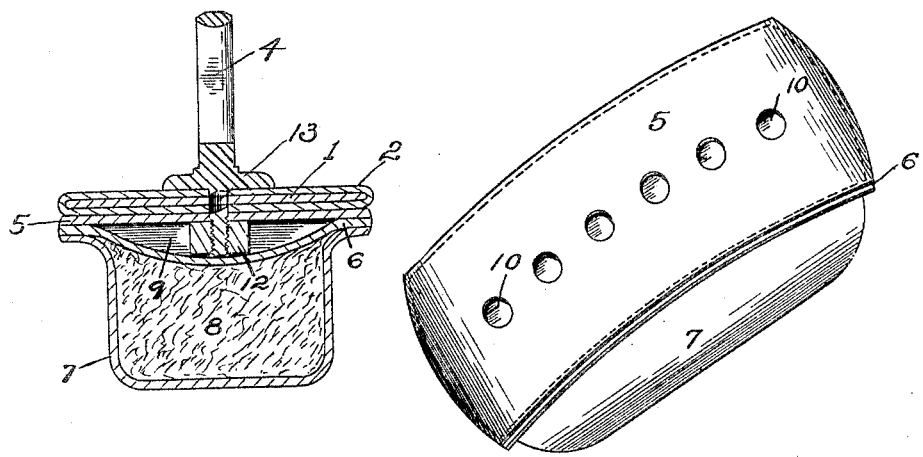
Witnesses
W. L. Pollard
Victor Georg.
Inventor
Charles F. Wiesenmeyer
By Atty N. DuBois.

UNITED STATES PATENT OFFICE.

CHARLES F. WIESENMEYER, OF SPRINGFIELD, ILLINOIS.

HARNESS-SADDLE.

No. 804,446.　　　Specification of Letters Patent.　　　Patented Nov. 14, 1905.

Application filed March 7, 1905. Serial No. 248,931.

*To all whom it may concern:*

Be it known that I, CHARLES F. WIESENMEYER, a citizen of the United States, residing at Springfield, in the county of Sangamon and State of Illinois, have invented certain new and useful Improvements in Harness-Saddles; and I do hereby declare the following to be such a full, clear, and exact description of the same as will enable others skilled in the art to which it appertains to make and use my said invention.

This invention relates to certain new and useful improvements in harness-saddles, and has for its purpose to provide a harness-saddle having a springy arch and having movable yielding pads which may be moved to adjust the saddle to the back of the animal on which it is used, so as to avoid undue pressure or rubbing on any part of the back.

With these ends in view my invention consists in the novel features of construction and combinations of parts shown in the annexed drawings, to which reference is hereby made, and hereinafter particularly described and finally recited in the claims.

Referring to the drawings, in which similar reference-figures designate like parts in the several views, Figure 1 is an elevation of the complete harness-saddle. Fig. 2 is an enlarged perspective view of one of the pads detached, and Fig. 3 is a vertical transverse section on the line 3 3 of Fig. 1.

The arch of the saddle consists of a steel band 1, covered with leather 2 and having a checkrein-hook 3 secured to the band. On the under side of the arch are two movable pads, the pads having upper parts 5, intermediate parts 6, and lower parts 7, substantially as shown. The parts 5 have a series of holes 10 in line with each other. The parts 5 and 6 are of heavy leather and are separated by a space 9, in which the nuts 12 slide, as hereinafter explained. The part 7 is of soft leather, such as will not chafe the back of the animal. The space between the parts 6 and 7 is filled with a pad of yielding material, such as hair. The parts 5, 6, and 7 are all securely sewed together.

The turrets 4 and the screws 11 pass through holes 13 in the arch. Nuts 12 fit on the screws 11 and on the screw-threaded parts of the turrets 4, and the nuts are slidable in the channel 9.

The pads may be adjusted longitudinally relative to the arch by unscrewing the screws 11 and the turrets 4 and then sliding the pads into the desired position and then placing the nuts in registry with the corresponding holes and again screwing the screws and the turrets into the nuts. Holes 10 in the pads are so situated as to permit adjustment of the pads in any desired position. The arch being springy causes uniform pressure along the entire length of the pad and also yields to prevent undue pressure on the back of the animal.

By moving the pads toward the center of the arch the saddle may be fitted to a narrow back, and by moving them away from the center of the arch it may be fitted to a broader back. It will be seen then that the saddle is adapted for use on animals having either narrow or broad backs and in either case will fit the back closely, so that the saddle will not slip nor rub the animal's back, and the yielding pad readily conforms to the back of the animal.

Having fully described my invention, what I claim as new, and desire to secure by Letters Patent, is—

1. A harness-saddle comprising a yielding arch having holes, screws and turrets fitting in the holes of said arch, pads each having a series of holes and an internal channel or way, and nuts slidable in the channels of the pad and fitting on the screws and on the screw-threaded parts of the turrets.

2. A pad consisting of an upper part of hard leather having a series of holes; an intermediate part of hard leather connected to form a way between said upper part and intermediate part, a lower part connected with said upper and intermediate parts and a filling of yielding material between said lower part and intermediate part; in combination with an arch having holes, screws and turrets fitting in the holes in said arch, and nuts slidable in the way of said pad and fitting on said screws and the screw-threaded parts of said turrets.

In witness whereof I have hereunto subscribed my name, at Springfield, Illinois, this 8th day of February, 1905.

CHARLES F. WIESENMEYER.

Witnesses:
　LYMAN L. BROWNE,
　MARGARET MCDONALD.